UNITED STATES PATENT OFFICE.

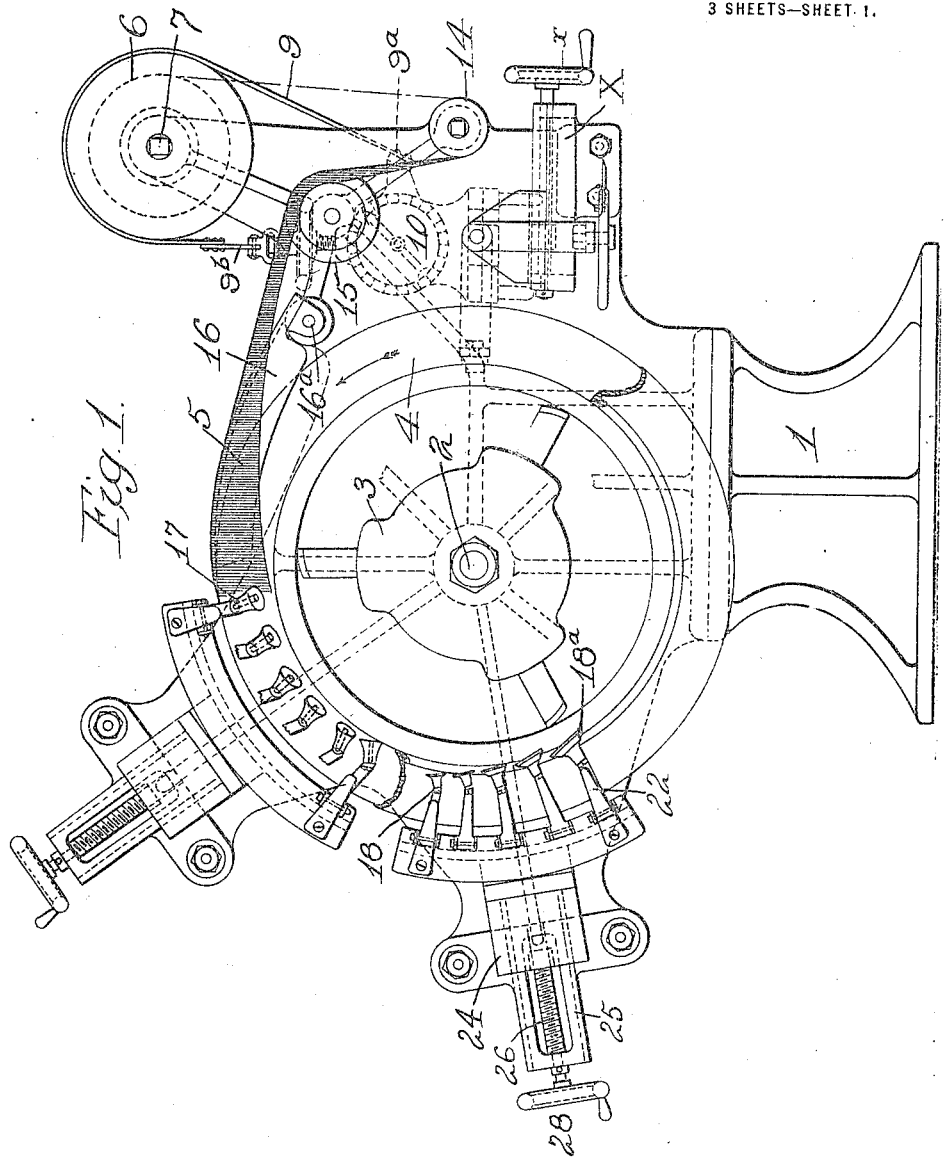

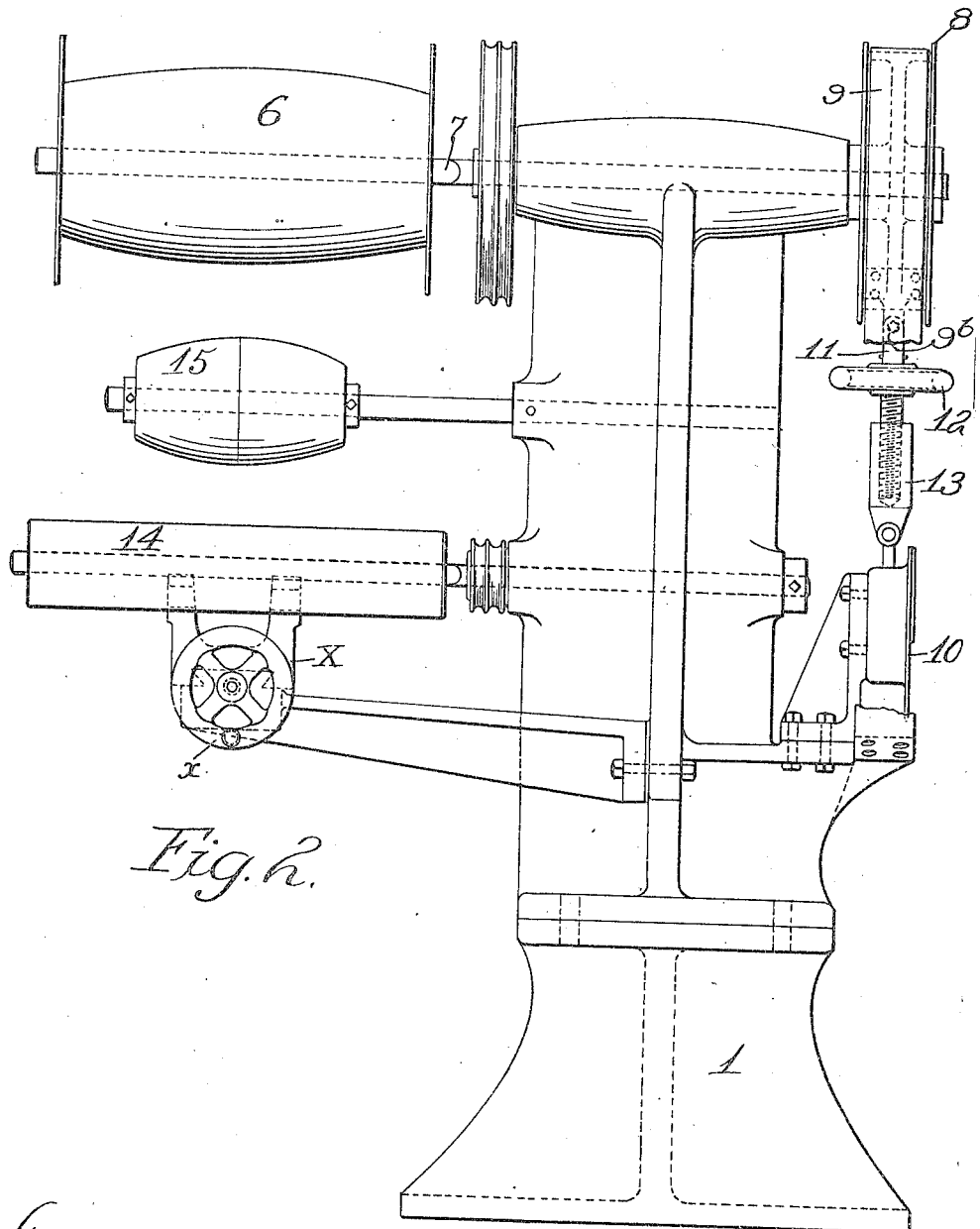

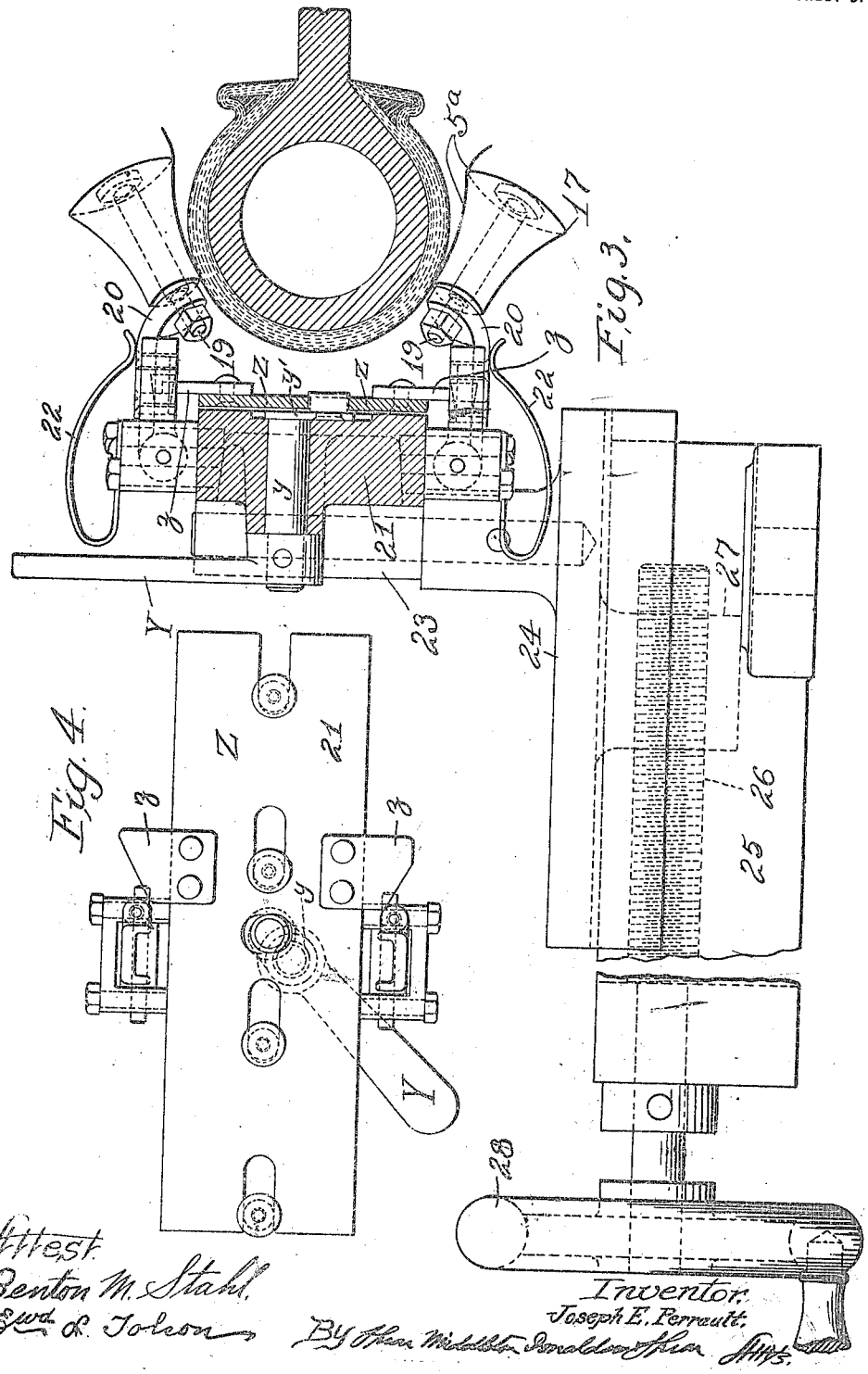

JOSEPH EVARISTE PERRAULT, OF BELMONT, MASSACHUSETTS, ASSIGNOR TO HOOD RUBBER CO., A CORPORATION OF MASSACHUSETTS.

TIRE-BUILDING MACHINE.

1,166,250.

Specification of Letters Patent.

Patented Dec. 28, 1915.

Application filed April 23, 1913. Serial No. 763,152.

*To all whom it may concern:*

Be it known that I, JOSEPH E. PERRAULT, a citizen of the United States, residing at Belmont, Massachusetts, have invented certain new and useful Improvements in Tire-Building Machines, of which the following is a specification.

My invention relates to an improved machine for manufacturing open-bellied tire casings or shoes for pneumatic tires.

The invention has among others for its object to provide an extremely simple, durable and economical form of machine which may be operated at a considerable speed and thus secure a large output; and further, to provide a machine in which the fabric will be smoothly applied and with a large amount of side tension, thus obviating any tendency of the fabric to crease or wrinkle.

With these and other objects in view, the invention includes the novel features of construction and arrangement and combination of parts hereinafter described and particularly defined by the appended claims.

A tire building machine constructed in accordance with my invention is illustrated in the accompanying drawings, in which—

Figure 1 is a side elevation; Fig. 2 is an end view showing the arrangement of supply spools and guide rollers, but with the core and strip applying devices omitted; Fig. 3 is a part sectional detail view of the applying rolls and their carrying mechanism; Fig. 4 is a detail plan view.

Referring by reference characters to this drawing, the numeral 1 designates a supporting stand or frame by which the parts are carried, and which has journaled therein a shaft 2 designed to be driven by any suitable power means (not shown). This shaft carries the customary spider 3 which, in turn, supports the ring core 4 upon which the casing or shoe is built. This machine is designed to form a casing by winding upon the ring core a continuous strip of rubberized fabric, which is indicated at 5. This fabric, at the start, is wound upon a spool 6 and is drawn therefrom under tension as the winding progresses, the spool being fast on a shaft 7 journaled in suitable bearings, and which shaft carries at its opposite end a drum 8 over which passes a friction band 9, one end of the band 9ª being anchored to the frame of the machine, while the other end 9ᵇ is connected to a scale balance 10 by an adjustable connection which may conveniently comprise a swivel bolt 11 provided with a hand wheel 12 and screwing into a threaded socket 13 by which the tension on the band may be varied. From the supply roll or spool the fabric passes around the guide roll 14 and thence over the forming roll or shaping roll 15, both of which rolls are idle rolls, and thence it passes over the forming shell or horn 16 which is pivoted to the frame at 16ª, and is curved in cross section to conform approximately to the curve of the periphery of the ring core. By this arrangement the fabric is drawn under the desired tension from the forming roll by the rotation of the ring core, and applied to the ring core at the extremity of the shoe in the properly curved form. The supply roll, tension device and guide means are mounted on a slide X capable of being moved on the frame 1 toward and from the ring core by means of hand wheel *x* so as to allow for making different sized tires and yet feed the fabric in proper relation to the circumference of the core.

For the purpose of drawing the fabric down tightly upon the ring core or the preceding layers of fabric, smoothly and tightly, and under the proper tension, and preventing any wrinkles, I provide a plurality of drawing rollers upon each side, and preferably in two series, as indicated at 17 and 18, these rollers being spring-pressed and also being adjustable toward and from the ring core to fit different sizes of cores, and thus enable the machine to manufacture different sizes of tires. As the mechanism for supporting both sets of rollers is the same, a specific description of only one of these is necessary. The rollers are idle rollers journaled on pins 19 carried by arms 20 which are pivoted to a carrier 21, and are pressed toward the ring core by springs 22. These carriers are carried by brackets 23 projecting from slides 24 guided on the frame parts indicated at 25, so as to be movable radially of the core, being operated by the screw 26 engaging a threaded boss 27 on the slides, and rotated by the hand wheel 28. All of the rollers 17 of the first series are preferably of approximately bell shape, or in the form of a flaring truncated cone, and the pins are not only inclined outwardly with relation to the plane of the ring core, but are inclined backwardly with relation to its direction of rotation, which direction of rotation is indicated by the arrow. By "inclined backwardly" I mean that the pin or axis of each roll is inclined to a radial line drawn from the axis of the core to the point of contact of the roll with the tire fabric so that a prolongation of the axis of each roll would pass above the axis of the core. It will also be seen that the successive rolls are in stepped rotation; that is, each successive roll is located a little nearer the inner edge of the ring core. By this arrangement the small end of the roll contacts with that part of the fabric which has been previously applied to and stitched on the periphery of the core, and is rotated thereby. This gives a gradually increasing surface speed as the flaring end of the roll is approached, the result being that the larger end of the forming roll draws the fabric forward onto the core and keeps it free from the waves or wrinkles which tend to accumulate toward the inner diameter of the core, the drawing action being toward the axis of the core by reason of the backward inclination of the axes of the rollers above referred to. The position of the fabric in relation to the rollers is indicated at 5$^a$ in Fig. 3. The action of the rollers 18 is substantially the same, the only difference being in the shape of the rollers, and as these are designed to lead up to and produce the stitching or creasing of the tire, their larger ends are gradually formed into or provided with larger or more sharply pronounced flanges, as indicated at 18$^a$.

It is desirable to provide means by which the forming rolls 17 or 18 may be thrown out of contact with the tire. For this purpose I provide a handle Y connected to a shaft $y$ which has a cam or eccentric $y'$ capable of pushing the slide Z laterally. Fingers or projections $z$ are secured to the slides Z and have inclines to act on the arms carrying the rolls to force them back against the tension of the springs.

Having thus described my invention what I claim is:—

1. In a machine of the class described, a rotatable ring core, means for applying tire forming fabric thereto, a plurality of pairs of forming rolls having their axes inclined outwardly with relation to the plane of the core, and inclined backwardly with relation to the direction of rotation of the core, and a plurality of pairs of rollers having similarly inclined axes and provided with stitching or creasing flanges.

2. In a machine of the class described, a rotatable ring core, means for feeding tire forming fabric thereto, a slide adjustable toward and from the ring core, a plurality of pairs of arms supported from said slide, springs for forcing the arms of each pair toward each other, rollers carried by said arms, and means for simultaneously forcing the arms apart.

In testimony whereof, I affix my signature in presence of two witnesses.

JOSEPH EVARISTE PERRAULT.

Witnesses:
J. R. MOTT,
E. G. BROWNE.